H. F. SMITH.
METHOD OF DETERMINING THE TOTAL AVAILABLE HEAT OF GASEOUS FUEL.
APPLICATION FILED SEPT. 20, 1912.
1,189,300.  
Patented July 4, 1916.
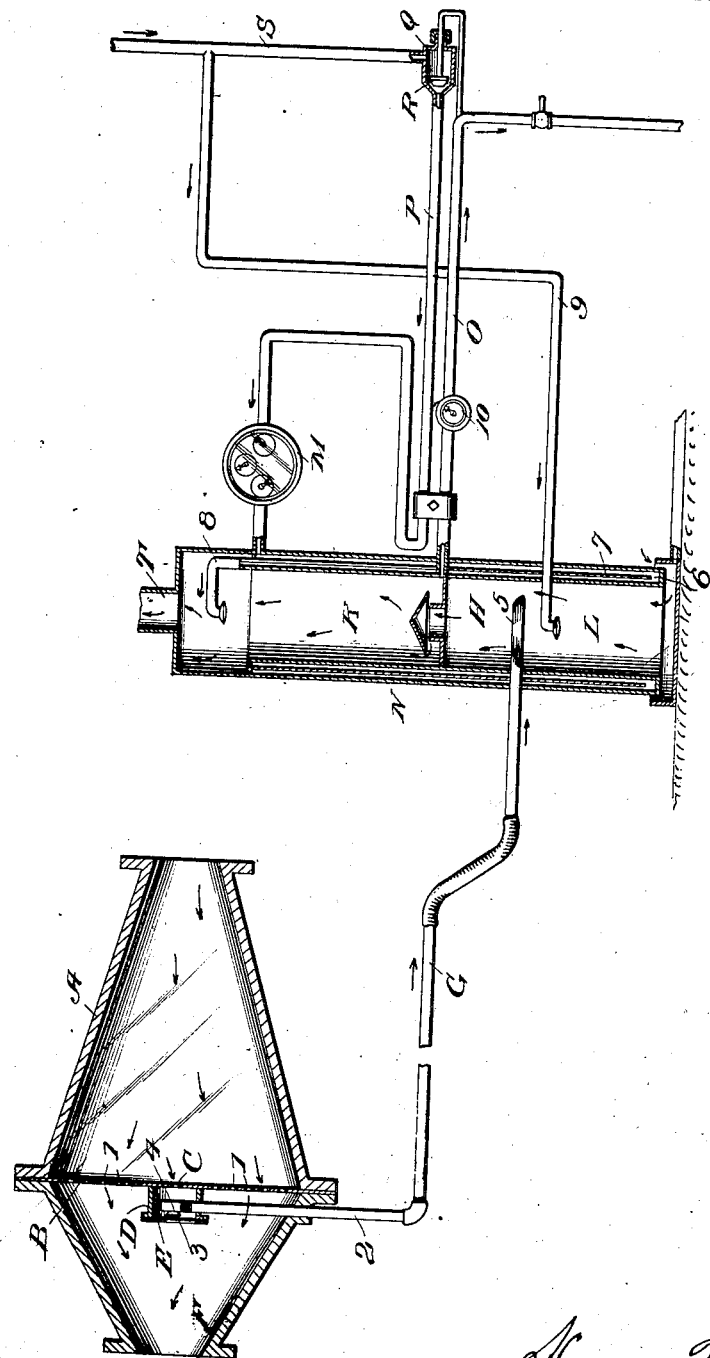

UNITED STATES PATENT OFFICE.

HARRY FORD SMITH, OF LEXINGTON, OHIO.

METHOD OF DETERMINING THE TOTAL AVAILABLE HEAT OF GASEOUS FUEL.

1,189,300.   Specification of Letters Patent.   Patented July 4, 1916.

Application filed September 20, 1912. Serial No. 721,416.

*To all whom it may concern:*

Be it known that I, HARRY F. SMITH, a citizen of the United States, residing at Lexington, in county of Richland and State of Ohio, have invented certain new and useful Improvements in Methods of Determining the Total Available Heat of Gaseous Fuel, of which the following is a specification.
This invention relates to an improvement in the method for determining the total available heat of gaseous fuel, and the object is to provide means for determining the quantity of heat available in gaseous fuel flowing through a main by procuring a quantity or sample of the gaseous fuel from the main, and ascertaining the total heat developed by the combustion of the sample.

The ordinary method for determining the available heat of gas has heretofore consisted in measuring a quantity of gas, reducing this quantity to terms of accepted standard conditions of pressure and temperature, then separately determining the heating value of the gas per unit volume corrected to the same standard conditions of temperature and pressure and multiplying the total volume of gas so determined by the heating value per unit volume so determined. This method involves numerous difficulties. For example in metering the quantity of gas there is considerable liability to error, first in determining the volume actually passing, and second, in determining accurately the temperature and pressure conditions of such volume, and third, in applying suitable corrections for the deviations from standard conditions observed. In metering gas, for example as supplied to gas engines or other similar devices, utilizing the gas at frequent intervals but not uniformly, pulsations are set up in the gas main which interfere with a correct determination of the volume. Furthermore when an attempt is made to use the simple forms of metering apparatus, such as Pitot tube or Venturi tube, compensation must be made not only for errors due to pulsations in the main but also for variations in the specific density of the gas as determined by its composition. Furthermore in determining the heating value per unit volume of gas, similar difficulties are encountered. It is necessary not only to determine the total heat developed by the combustion of the gas sample, but it is equally necessary to determine very accurately the actual volume of gas, and to apply suitable corrections for variations in temperature and pressure from accepted standard conditions.

In the present invention, many of these difficulties have been eliminated, and as a result not only can simpler appliances be used, but more accurate results can be obtained.

The invention consists, first, in securing a suitable sample of the gas flowing through the gas main, which must be a certain definite and known fraction of the total volume of gas flowing; and second, in determining the total heat contained in the sample of gas. It is understood that the total available heat in the gas flowing through the main can be determined by multiplying the total heat in the sample taken by a number representing the ratio of this sample to the total volume of gas.

The drawing discloses an apparatus for carrying out the invention, but as this apparatus is only one form of a number which might be used in carrying out the invention, it is not the intention to limit the use of the invention to this particular type of apparatus.

A, represents a housing or casing which is preferably made in two sections, and connected between the sections is a metal disk B. The housing or casing is adapted to be connected to a gas pipe or main, not shown.

The metal disk or diaphragm B is located in the path of the gas current, the gas passing through the housing in the direction indicated by the arrow. The diaphragm is provided with a large number of perforations or openings 1, 1, and we will assume, for example, that the diaphragm contains two hundred (200) orifices, the total area of which is sufficient to pass the total volume of the gas whose heat is to be measured. It will be seen that each one of the 200 orifices will pass an equal amount of gas, that is to say, each orifice will pass one-half of the one per cent. of the total volume of gas passing through the main.

One of the orifices, for example the one indicated at C, is segregated from the remainder by the chamber D, which is supported on the diaphragm B. A tube or pipe 2 passes through the apparatus or housing A and into the chamber D for conducting the gas from the chamber D which enters through the orifice C. In order that the pressure within the chamber D may always be the same as that in the space surrounding the chamber D, the front or open end of the chamber is covered by an elastic diaphragm E which is free to move, and which transmits the pressure from the surrounding space F to the space within the inclosure or chamber D. The closing of the end of the chamber D by the diaphragm E is necessary for maintaining the pressure on each side of the orifice C the same at all times, as the difference in pressure on the two sides of every other orifice in the diaphragm B. It will be understood, that if there are any pulsations in pressure in the space F, that the pulsations will be transmitted equally to each of the two hundred orifices, including also the orifice C. Therefore, whatever changes in rate of flow may be caused by such pulsations in pressure, these changes will affect equally and in like manner each one of the various orifices in the diaphragm. It is further to be noted, that if the volume of gas should be affected by changes in temperature or pressure that whatever effect these differences may have will be transmitted equally to each one of the orifices in question. Furthermore any change in density or specific gravity of the gas, due to change in the composition of the gas, will affect in exactly equal manner the flow of gas through each one of the various orifices shown. In order that the flow of gas from the chamber D may always be just sufficient to maintain pressure within the chamber D that will be exactly equal to the pressure in the chamber F, a valve 3 is attached to the diaphragm E, which is adapted to regulate the flow of gas through the opening 4 in the tube or pipe 2; so that should the pressure within the chamber D become slightly greater than within the space F, the diaphragm will move so as to draw the valve away from the opening 4 to permit the surplus of gas to escape through the pipe 2. On the other hand, should the pressure in the chamber D be, from any cause, less than that in the space F, the diaphragm E will move so as to close to a greater or less extent the valve 3 for restricting the flow of gas through the pipe 2, thereby permitting the pressure in the chamber D to again rise until it is equal to the pressure in the space F. By this or by any other suitable means, a sample of gas is secured which is truly representative of the average heat value and composition of the gas measured, and which bears a definite volumetric proportion to the total volume of gas passing the apparatus.

In a diaphragm provided with two hundred orifices the gas discharged from one orifice would be one-half of one per cent. of the total. It is to be noted that it is a matter of entire indifference what the actual volume of the gas sample taken from the main is, and it is entirely unnecessary to know the condition of the gas with respect to pressure, temperature, specific gravity, or volume, except that the sample should be a definite fraction of the total volume and that it represents the average heating value of the whole.

The sample of gas procured with the apparatus as above described, is conducted through a pipe G to an apparatus N in which the total heat which the sample will develop on burning is determined. The apparatus N illustrates one method whereby the total heat may be determined and measured, but other methods of determining the total heat could be adopted, which are familiar to those skilled in the art.

In the apparatus shown, H is a combustion chamber in which the gas sample is burned with air. A burner 5 is connected to the pipe G for burning the gas in the combustion chamber. A chamber K is formed above the combustion chamber through which the heat and products of combustion pass, in which chamber the heat and products of combustion come into direct contact with water to be heated, and the products of combustion are discharged at the top of the apparatus through an outlet T, at a temperature equal to that of the inflowing water. In order that the condition of the ingoing air, to be burned with the gas, may be the same with respect to temperature and moisture as that of the outgoing products of combustion, a chamber L is provided through which the ingoing air to the apparatus is brought into contact with water at the same temperature as that supplied to the chamber K. The air passing upward through the chamber L is fully saturated with moisture and brought to the same temperature as that of the incoming water. In the chamber H this air enters into combustion with the sample of gas and the heated products of combustion pass upward through the chamber K, imparting their heat to the water and being discharged at T under the same conditions of temperature and moisture as obtained for the ingoing air. In this manner, the rise in temperature of the water passing through the chamber K in conjunction with the volume or weight of water so passing determines the total heat developed by the combustion of the gas.

A pipe S constitutes a source of water supply and a valve chamber or casing Q receives water from the pipe S. A pipe P is connected to the casing Q for conducting the water to the heat-absorbing chamber K. The water is discharged through the casing of the apparatus N, and then down passing through openings 6 in the bottom of the concentric partition 7 which is located between the casing of the apparatus N, and the chamber L, combustion chamber H and chamber K. The water after passing between the partition and chambers L, H and K, is discharged into the top of the chamber K, through a pipe 8. A meter M, is connected to the pipe P for measuring accurately the quantity of water passing to the heat absorbing chamber K. A pipe 9 is connected to the supply pipe S for conducting water to the chamber L, which water is not measured. A pipe O is connected to the lower end of the chamber K for conducting the heated water from the chamber, and connected to the pipe is a measuring instrument 10 for determining the temperature of the water.

Pipes P and O form a thermostatic arrangement whereby a constant difference in temperature is maintained between the ingoing water and the water discharged from the chamber K. The member O consists of a tube capable of changing its length with heat, constructed preferably of brass or some similar metal through which the water discharged from the chamber K passes. The pipe P is constructed of the same metal, and through which pipe the water is conducted to the chamber K. A valve R is connected to the pipe O and passes freely through the valve casing Q, to permit of its movement. If the temperature of the pipes O and P are the same, there will be no movement of the valve R. For a given difference in temperature between the pipes O and P there will be a definite opening of the valve R. Should the temperature of the pipe O become greater than the temperature of the pipe P, the pipe O would expand and open the valve R wider so as to permit a greater quantity of water to flow through the pipe P; but on the contrary should the temperature of the member O be reduced, the valve R would be correspondingly closed and thereby reduce the quantity of water passing through the pipe P. By this method the quantity of water flowing through the apparatus is so governed as to maintain a constant temperature difference between the ingoing and outgoing water. It clearly follows, therefore, that this temperature difference multiplied by the weight or volume of water entering the apparatus will give directly the total heat absorbed by the water. In order to determine the weight of water passing the apparatus, a suitable metering apparatus M is installed, so as to accurately measure or weigh the water passing into the chamber K. It is clear that the total flow of water through the meter M is directly proportioned to the total development of heat in the combustion chamber H, and this in turn is directly proportioned to the rate of flow of heat in potential form as combustible gas through diaphragm A and chamber K. By suitably graduating the dials of the meter M, readings can be obtained directly in terms of heat units. It is not necessary that this method of recording the rate of flow of heat units be employed. For example it may be deemed more desirable to know the rate of flow at any particular time, and in this case provision can be made for passing water at a constant rate through the chamber K. In this case the difference in temperature between the discharged water and the ingoing water supply will bear a direct relationship to the heat developed at that particular moment in the chamber H.

It is clear from a careful examination of the method proposed that not only is the apparatus much simplified, but many difficult and complicated corrections are entirely avoided. For example, it is entirely unnecessary to know anything concerning the actual volume of gas passing the diaphragm A. It is unnecessary to know anything concerning its specific heating value per cubic foot. It is unnecessary to make any corrections for temperature, pressure, or specific gravity. Likewise in determining the total heat available, all that is required is to measure the heat liberated by the combustion of the gas sample delivered to the chamber H. As a practical consideration it will be noted that the quantity of heat available for use in the chamber H may be larger than that which is ordinarily considered necessary to use in connection with the determination of heat value per cubic foot. It is accordingly possible to determine the total heat with great accuracy for the reason that any small heat losses from the apparatus from radiation or the like bear a much smaller proportion to the total heat than in the case of the ordinary type of calorimeter for determining the heat value per cubic foot. The advantages of this invention are obvious to anyone familiar with the art. It is seldom necessary or desirable to know the volume of combustible gas in cubic feet. For all engineering purposes it is necessary to determine from this volume the total heat available in the gas. By the present method, the necessity for making the intermediate determination in cubic feet and the similar determination of heat value per cubic foot is entirely avoided. Furthermore, the apparatus as shown is quite independent of the usual difficulties connected with metering gas. Pulsations in the gas pressure do not affect the readings of the apparatus. Variations in temperature, pressure, and specific gravity, need not be considered as they do not enter into the determination in any way. Even a partial fouling of the various orifices by accumulations of dirt through the passage of impure gas would not materially affect the readings of the apparatus. Each orifice would be passing the same kind of gas, and would be fouled in approximately the same degree. It is only essential that all of the orifices shown should be at any given time operating under the same conditions. In determining the total heat, the process is materially simplified for the reason that it is entirely unnecessary to make any determination with respect to the volume of gas treated. In determining the heat per cubic foot of gas, it is very important that the gas be accurately measured. With the apparatus in question it is not necessary to determine either the volume, temperature, pressure or specific gravity of the gas sample delivered to the heat-measuring device, and the total heat available in the gas is determined with much simpler apparatus, and with materially less liability to error than with the methods that have heretofore been employed for this purpose.

Having fully described the invention, what is desired to be secured by Letters Patent, is:—

1. A method of determining the total available heat of gaseous fuel flowing through a main, consisting in separating from the flowing stream in the main a stream proportional thereto without determining the actual volume of either portion, of then burning the proportional stream of flowing gas and determining the heat units thus developed, and multiplying the quantity thus determined by the ratio between the streams.

2. A method of determining the total available heat of gaseous fuel delivered through a main, consisting in procuring a sample of the gas from the main, burning the gas sample in and with moistened air and passing the products of combustion through a liquid, and determining the total heat developed by the combustion of the gas sample from the liquid which has been heated by the products of combustion passing through the liquid.

3. A method of determining the total available heat of gaseous fuel delivered through a main, consisting in procuring a sample of the gas from the main, which gas is a definite fraction of the total volume, burning the gas sample and passing the products of combustion through a liquid, and determining from the liquid the total heat developed by the combustion of the gas sample.

In testimony whereof I affix my signature, in the presence of two witnesses.

HARRY FORD SMITH.

Witnesses:
 Geo. H. Trout,
 Thomas Cureton.